Patented Jan. 20, 1925.

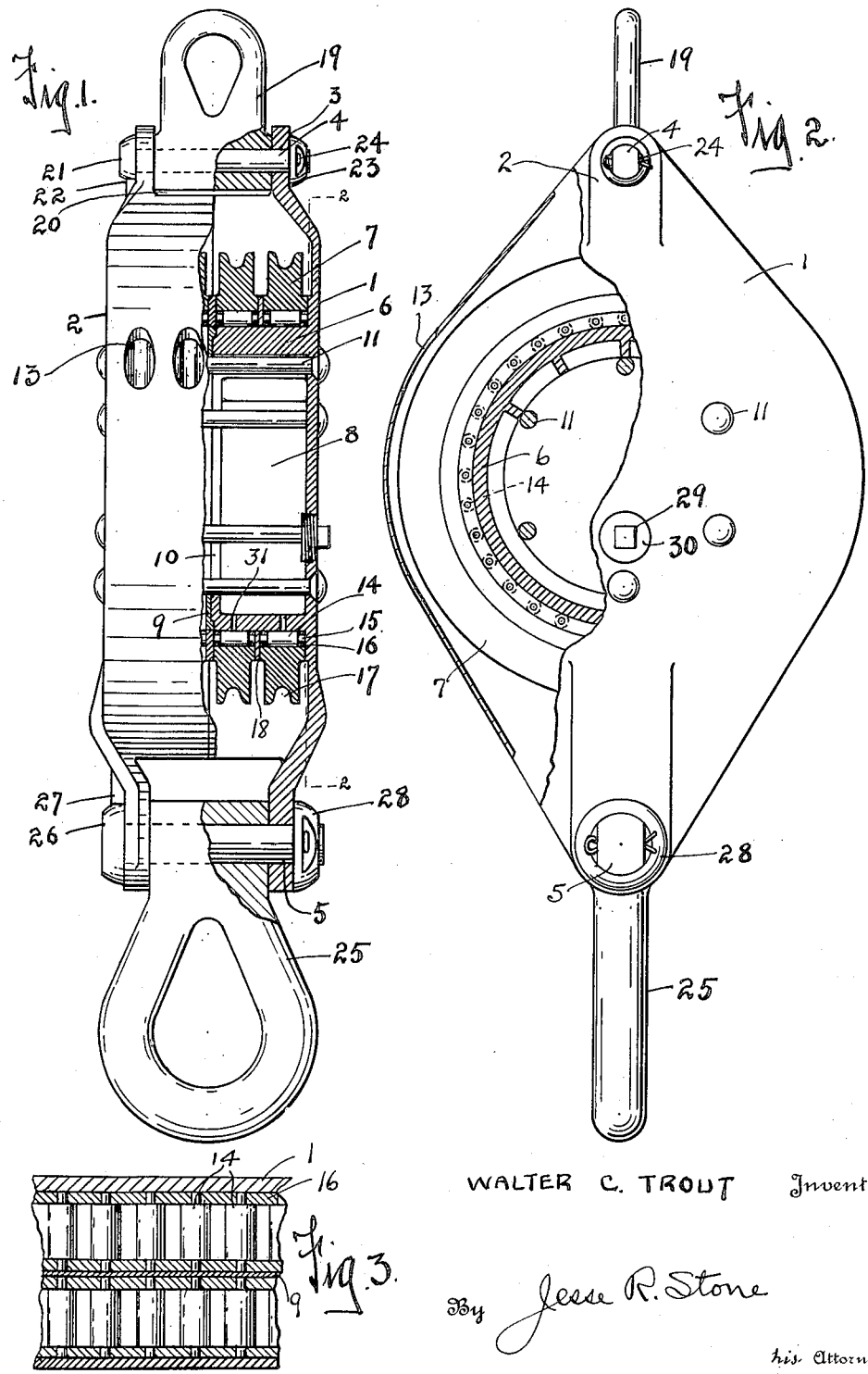

1,523,733

UNITED STATES PATENT OFFICE.

WALTER C. TROUT, OF LUFKIN, TEXAS

TRAVELING BLOCK.

Application filed May 1, 1923. Serial No. 635,862.

*To all whom it may concern:*

Be it known, that I, WALTER C. TROUT, a citizen of the United States, residing at Lufkin, Angelina County, Texas, have invented a certain new and useful Improvement in Traveling Blocks, of which the following is a full, clear, and exact description, such as will enable others skilled in the art to which it appertains to make and use the same.

My invention relates to an improvement in traveling blocks, and is particularly designed for use on oil well derricks in handling the drill stem and tools in the operation of drilling.

A traveling block used in connection with the drilling operations must be exceedingly strong and durable and capable of sustaining very heavy loads.

The object of my invention is, therefore, to provide a traveling block having pulleys arranged thereon of strong material, and adapted to roll upon a rugged and durable support which is so arranged that the wear thereon will be reduced to a minimum.

Another object is to provide a traveling block which is housed, for safety and protection, so that the parts may not be easily broken or the cable removed from the pulleys.

Another object is to provide an attaching means at each end of the block which may be made stronger and more durable than the ordinary type now is use.

Other objects and advantages and the means by which they are accomplished will appear more clearly in the description which follows:

Referring to the drawing herewith wherein like numerals of reference are applied to like parts in all the views, Fig. 1 is a side elevation of my improved traveling block, one part thereof being broken away and shown in central longitudinal section; Fig. 2 is a front elevation taken at right angles to the view shown in Fig. 1 and having a part of the housing broken away approximately on the line 2—2 of Fig. 1; Fig. 3 is a broken detail view illustrating the mountings for the roller bearings.

The principal purpose of my invention is to form the tool of such strong and rugged construction that it will last for long periods of time and wherein liability of accidental breaking is reduced to a minimum. In carrying out this purpose I have formed the supporting structure of the block in a manner so that the device will be practically self contained. There are two cooperating side plates 1 and 2 which are joined together in such a way as to completely enclose the pulleys. Each of the side plates is approximately oval in outline, as shown in Fig. 2, and has its sides extended inwardly to form a saucer-shaped member adapted to fit against the opposite plate, so as to enclose the operating parts. The upper end is formed with a reinforcing boss thereon with a central opening 3 therethrough to receive a shackle bolt 4 by means of which the two parts are secured together. The lower end is similarly formed, and has an opening therethrough to receive a bolt 5 also serving to secure the plates together.

The inner face of each of the side plates which form the housing has an inwardly projecting circular flange or bearing, 6. This bearing member is of comparatively large diameter so as to provide a large outer bearing surface for the pulleys 7. The inner portion of the bearing member formed by the flange 6 is hollow so as to form a box or chamber 8 which is designed to be filled with lubricant. The inner face of the flange 6 is offset slightly, as shown at 9 and extended inwardly to form a rim 10 adapted to fit against a similar rim on the cooperating part, and thus form a fluid-tight connection preventing leakage of oil into the housing. The plates are connected together by means of the two end bolts 4 and 5, and also by a plurality of cross pins 11 extending transversely through the housing and fitting within countersunk recesses 12 in the outer faces of the plates and caulked or upset, to fit tightly therein and prevent leakage of lubricant therethrough. These pins are shown as six in number in this particular embodiment, and are positioned to extend through the lubricant chamber 8. The side walls of the plates are perforated on the upper side at 13 to allow the passage of the cable into the housing, there being an opening 13 immediately adjacent each of the pulleys within the housing.

Each of the pulleys 7 is made up of a steel ring of sufficient diameter to fit around the outer surface of the bearing formed by the flange 6, and are spaced from the said bearing a sufficient distance to allow the use of an intervening non-friction bearing member made up of cylindrical rollers 14.

These rollers are spaced at intervals around the interior of the pulleys and are held in spaced relation from each other by having a small trunnion 15 on each end thereof, fitting within annular rings or plates 16 fitting between the outer end of the roller and the adjacent wall of the housing, as shown particularly in Figs. 1 and 3. The pulley has a rope or cable groove 17 formed on its outer periphery to receive the cable, not shown. Each of the pulleys is spaced from the adjacent pulley by means of a spacing washer 18.

At the upper end of the block is a supporting shackle or eye, 19, which, because of the construction of the housing, may be heavy and of sufficient thickness to fit between the upper side walls formed by the two plates 1 and 2. The bolt 4 which secures the side plates together, also forms a pivot for the shackle. The side wall of the housing is cut away slightly at the upper end to provide room for the pivotal movement of the shackle upon the bolt, as shown at 20. The head 21 of the bolt is formed with one side flattened so as to fit against a lug 22 formed on the housing, and to thereby prevent rotation of the bolt during the operation of the tool. The opposite end of the said bolt has a nut 23 thereon, held in place by means of a cotter pin 24 extending through the nut and the pin.

The lower end of the block has thereon a shackle or clevis 25, of heavy construction. It is also received between the side plates 1 and 2 of the housing, and the pin or bolt, 5, which forms a pivot therefor is also of heavy construction to support the load which the block is designed to handle. This bolt also has a head 26, flattened on one side to fit against a lug 27 and prevent rotation of the bolt. A nut 28 on the other side is secured in place by a cotter pin in the same manner as is the nut 23 on the opposite end of the block.

In the use of this block, one end of the supporting cable is ordinarily secured within the eyelet 19 at the upper end, and the said cable then is carried up over one of the pulleys of the crown block, and back down through one of the openings 13 and around one of the pulleys 7 of the block, and back upwardly through another opening 13 on the opposite side of the housing, and back to the corresponding pulley on the crown block, and then again back around the adjacent pulley upon the traveling block, until, by repetition of this winding, the cable is passed around each of the pulleys of the block. The traveling block is then ready to support the load of the drill stem and drill, or any other load which it is designed to handle, the said load being secured to the shackle 25. The pulleys 7 are, because of their construction, designed to carry heavy loads and to allow the running of the cable thereon at high speeds. Being made of a ring of metal, having a large bearing surface on the inner side thereof, they may be formed of hardened steel, and thus enabled to withstand hard usage. The interior surface is of large area and the wear thereon will be reduced thereby to a minimum. The use of non-friction bearings as shown in the drawing will also further tend to decrease the amount of wear and to enable the pulleys to operate smoothly and easily.

The central chamber 8 is, in use, filled with oil or lubricant. An opening is formed in one side wall of the housing at 29 to receive a threaded plug 30 therein. This provides an opening for the filling of the chamber with lubricant, and also allows the insertion of the hand of the operator or of a tool, to clean the interior bearing ducts. The oil from the chamber is fed through openings 31 in the lower wall of the bearing on to the rollers 14. This provides a chamber which will hold a charge of oil sufficient to last for long periods of time, and will prevent the necessity of frequently re-charging the chamber.

The housing and the shackle bolts and nuts thereon are formed so as to round off the ends of the housing in order to prevent their catching upon the joints of the pipe or against other obstructions during the use of the block. The housing also is formed closely adjacent the side of the pulleys so as to prevent the cable from becoming disengaged from the pulley and thus resulting in accidents. The housing also prevents objects from becoming caught in the pulleys during operation, and also protects the pulleys themselves from injury due to blows or the like, and from dirt which ordinarily may be smeared over the block when in use.

The advantages of this type of construction will be clear to one skilled in the art. There will be little liability for injury due to breakage. The pulleys will withstand heavy loads and run at high speed without material injury or wear. The device is strong and compact, and of such form that it will be convenient and safe in operation. There are few parts, and these parts may be constructed of steel, thus further insuring long and satisfactory service.

Having thus described my invention, what I claim as new and desire to protect by Letters Patent is:

1. In a traveling block a longitudinally divided housing, inwardly extending annular flanges on the sides of said housing constituting a bearing support of comparatively large diameter, a plurality of rings on said bearings, said rings having peripheral grooves to receive an operating cable, the side walls of the housing having openings to allow the passage of the cable therethrough, and supporting means at the upper and lower ends of said housing.

2. In a traveling block, two opposite cup-shaped plates forming a housing, an annular flange on each plate cooperating to form a hollow bearing shaft of large diameter, pulley rings on said shaft, non-friction means between said rings and shaft, means to hold said plates together, and attaching means at each end of said plates.

3. In a traveling block, a support comprising two oblong dish-shaped plates interfitting to form a housing, annular flanges centrally of said plates cooperating to form a hollow bearing of large diameter, adapted to contain a lubricant, grooved pulley rings on said bearing and shackles at each end of said housing, there being ducts in said bearing to feed lubricant to said pulley rings.

In testimony whereof, I hereunto affix my signature this 25th day of April, A. D. 1923.

WALTER C. TROUT.